(12) United States Patent
Han

(10) Patent No.: US 7,925,428 B2
(45) Date of Patent: Apr. 12, 2011

(54) METHOD AND APPARATUS FOR EFFICIENTLY STORING MAP DATA REGARDING CALCULATED ROUTE FOR NAVIGATION SYSTEM

(75) Inventor: Maung Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 594 days.

(21) Appl. No.: 11/999,592

(22) Filed: Dec. 6, 2007

(65) Prior Publication Data

US 2009/0150062 A1 Jun. 11, 2009

(51) Int. Cl.
*G01C 21/00* (2006.01)
(52) U.S. Cl. ............. 701/201; 701/1; 701/25; 701/202; 701/208; 701/209
(58) Field of Classification Search .................... 701/201
See application file for complete search history.

(56) References Cited

U.S. PATENT DOCUMENTS

| | | | |
|---|---|---|---|
| 5,031,104 A * | 7/1991 | Ikeda et al. ................... | 701/209 |
| 5,938,718 A * | 8/1999 | Morimoto et al. ............ | 701/201 |
| 2005/0071077 A1* | 3/2005 | Kadono et al. ................ | 701/201 |
| 2005/0137790 A1* | 6/2005 | Yamada et al. ............... | 701/202 |
| 2008/0004803 A1* | 1/2008 | Kikuchi ........................ | 701/209 |
| 2008/0033639 A1* | 2/2008 | Nakamura et al. ............ | 701/208 |

FOREIGN PATENT DOCUMENTS

JP 2000-329571 11/2000

* cited by examiner

*Primary Examiner* — Khoi Tran
*Assistant Examiner* — Jonathan L Sample
(74) *Attorney, Agent, or Firm* — Muramatsu & Associates

(57) ABSTRACT

A method and apparatus for a navigation system efficiently stores the data associated with a calculated route to the destination in a backup memory by incorporating a direction coding method. The method and apparatus can be advantageously implemented in such a situation where the operation of the navigation system is terminated during the route guidance operation before reaching the destination. Since each direction code requires a small amount of data bit, an overall amount of data for the calculated route can be dramatically reduced and can be stored in a small memory space. When the navigation system is restarted, the calculated route will be reproduced based on the direction codes retrieved from the backup memory, thereby enabling to continue the route guidance operation to guide the user the destination.

24 Claims, 13 Drawing Sheets

| Link | Mesh number | Link number |
|------|-------------|-------------|
| 21A  | 4 bytes     | 8 Bytes     |
| 21B  | 4 bytes     | 8 Bytes     |
| 21C  | 4 bytes     | 8 Bytes     |

Fig. 3

| | Command Byte | Operand Byte | Meaning |
|---|---|---|---|
| 161 | 0000 0001 | N (0 to 255) | Normal or Successive Direction Code of N bit pairs |
| 162 | 0000 0010 | L (-127 to +128) | Route climb point to next level L levels up or down |
| 163 | 0000 0011 | R | Repeat last direction for R times |

| | Command Byte | Operand Byte |
|---|---|---|
| 70 | 0000 0001 | 0 |
| 71 | 0000 0001 | 1 |
| 72 | 0000 0001 | 2 |
| 73 | 0000 0001 | 3 |

Fig. 4D

|  | Command Byte | Operand Byte |
|---|---|---|
| 17A | 0000 0001 | 2 |
| 17C | 0000 0001 | 2 |
| 17E | 0000 0001 | 3 |
| 17G | 0000 0001 | 2 |
| 17H & 17I | 0000 0011 | 2 |
| 17K | 0000 0001 | 3 |
| 17M | 0000 0001 | 2 |
| ... | 0000 00XX | X |
| 17X | 0000 00XX | X |

|    | Command Byte | Operand Byte |
|----|--------------|--------------|
| 90 | 0000 0001    | 0            |
| 91 | 0000 0001    | 1            |
| 92 | 0000 0001    | 2            |
| 93 | 0000 0001    | 3            |
| 94 | 0000 0001    | 4            |
| 95 | 0000 0001    | 5            |
| 96 | 0000 0001    | 6            |

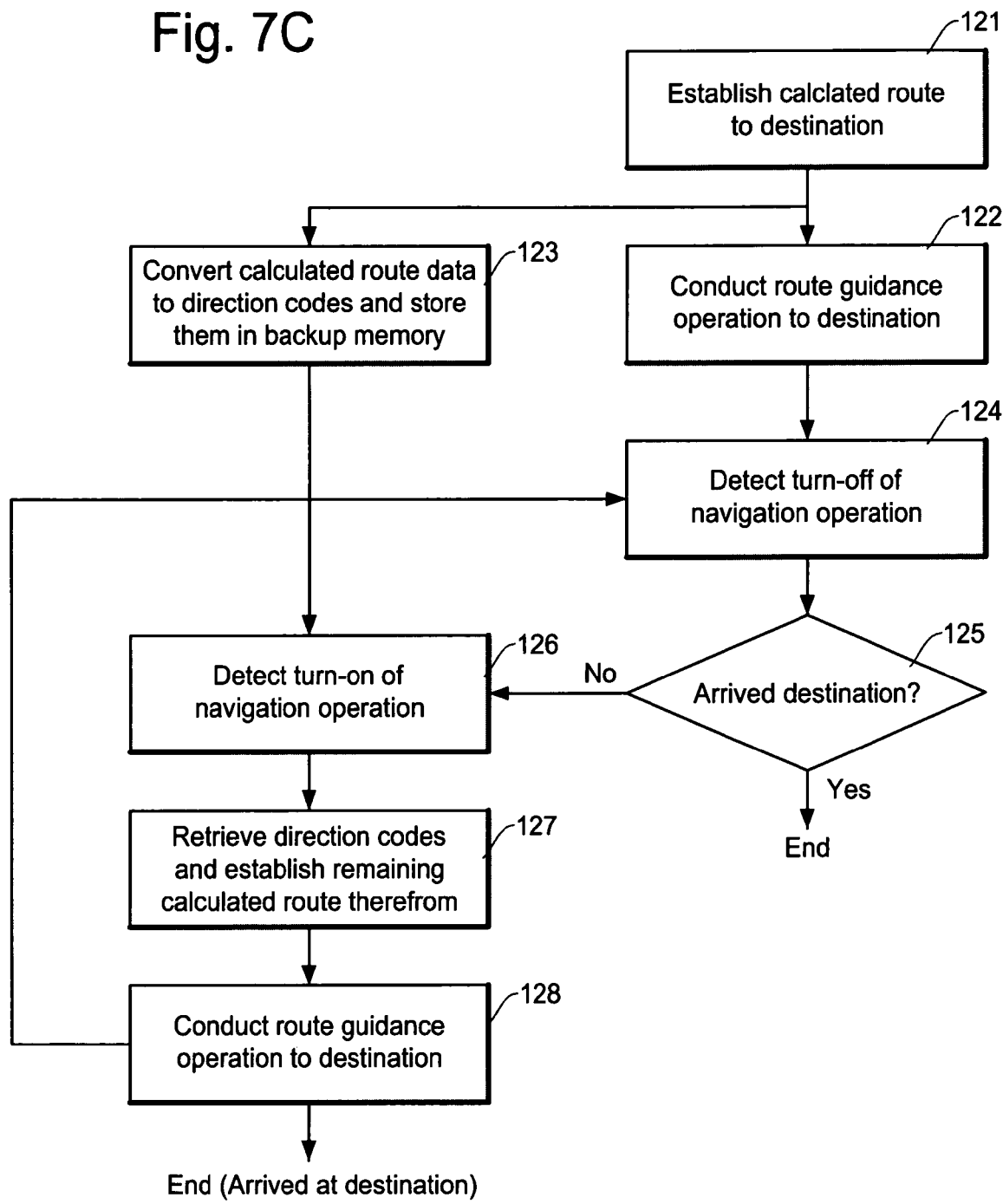

METHOD AND APPARATUS FOR EFFICIENTLY STORING MAP DATA REGARDING CALCULATED ROUTE FOR NAVIGATION SYSTEM

FIELD OF THE INVENTION

This invention relates to a method and apparatus for efficiently storing data in a memory, and more particularly, to a method and apparatus for efficiently storing map data associated with a calculated route to the destination in a backup memory of a navigation system by incorporating a direction coding method.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a DVD (digital versatile disc), or a hard disc. Typically, the navigation system displays a map image on a screen while superimposing thereon a mark representing the current location of the user.

Namely, when a destination is set, a navigation system retrieves and processes the map data to produce a calculated route, which is an appropriate route to the destination determined by predefined methods. For example, the calculated route is determined based on the shortest way to reach the destination, the route preferring freeways to surface roads, the least expensive way to the destination, or the route without using toll road, and the like. Then, the navigation system performs the route guidance operation to guide the user to the destination through the calculated route. At an intersection on the calculated route, if a turn is necessary, the navigation system notifies the user which direction to turn at the intersection.

During the route guidance operation, the navigation system successively retrieves the map data associated with the calculated route from the data storage medium and stores such map data in a memory and reads the map data in the memory for conducting the route guidance operation. The map data for the navigation system must includes a vast amount of information such as road shapes, road classes, allowable speeds and other traffic regulations, POI (point of interest) information, POI icons, map icons, etc. Thus, the process of storing and retrieving such a large amount of map data during the route guidance operation can be time consuming and inefficient.

In order to resolves such burdens, the map data used for a navigation system is typically structured in a multiple layer data format. FIG. 1 is a schematic diagram showing an example of such a multiple layer data format of the map data used in the navigation system. As shown, the data format in FIG. 1 is configured by a layer 11A, a layer 11B, a layer 11C and a layer 11D each representing a part of the map data to be stored in a memory of the navigation system.

Further, the map data in each of the layers 11A-11D are divided into a plurality of meshes or mesh portions represented by reference numerals 13. Namely, the map data is hierarchically layered corresponding to the level of details of the map information as well as divided corresponding to the size or amount of the map data. In the example of FIG. 1, the higher the layer is, the lower the detailedness of the map information is and the larger the mesh size is.

Typically, the higher layer represents only high class roads, for example, interstate highway, freeway, etc. while the lower layer represents low class roads, i.e., residential roads, etc., POI icons, building foot prints, etc., in addition to that represented by the higher layers. One of the reasons for using the layered structure is to accommodate several different map scales for enlarging or shrinking the map image on the display screen on the navigation system. Since the lower layer includes more detailed map data, the size of the mesh portion 13 is smaller than that of the higher layer to maintain the amount of map data within a predetermined range.

In FIG. 1, although the same numerals 15 are used to indicate the roads, the classes of the roads represented by them are not the same. Namely, the roads 15 in the higher layers represent only the high class roads while the roads 15 in the lower layer includes all the classes of roads. Further, as noted above, the map data in each data layer is divided into a plurality of meshes or mesh portions 13 each having a rectangular shape of a predetermined size.

Since the map data is treated as a unit of mesh portion 13 as shown in FIG. 1, the navigation system does not have to process an excessively large amount of data at a time. The layer 11A shown in FIG. 1 is comprised of one mesh 13A while the layer 11B is comprised of four mesh portions 13B, and the layer 11C is comprised of eight mesh portions 13C while the layer 11D is comprised of sixteen mesh portions 13D. Thus, the performance limitation caused by the hardware capability of the navigation system can be avoided by maintaining the map data in the suitable size.

FIG. 2A is a schematic view showing the relationship between road links and nodes which are basic components for representing a road. FIG. 2B is a table showing an example of data word length for expressing each road link shown in FIG. 2A. As shown in FIGS. 2A and 2B, in the map data, each road in the corresponding mesh portions in the layers 11A-11D of FIG. 1 is divided into small components called road links or links where each road link is typically a relatively short straight line.

The end of each link is further connected to other links where a connection point is represented by a node which is defined by absolute position data, i.e., latitude/longitude. In the example of FIG. 2A, within a mesh portion 13D, a link 21A has a node 23A and a node 23B, a link 21B has the node 23B and a node 23C, and a link 21C has the node 23C and a node 23D. Thus, the links 21A and 21B are connected at the node 23B and the links 21B and 21C are connected at the node 23C.

Typically, in the map data, each link is uniquely identified by a link number and a mesh number in addition to the absolute position data of each node noted above and data for specifying the layer. The mesh number for an intended link is to identify a particular mesh portion in which the intended road link is located. Generally, a mesh number is expressed by a data word consisting of four-byte long and a link number is expressed by a data word consisting of eight-byte long as shown in the table in FIG. 2B.

Namely, in the table of FIG. 2B, each of the road links 21A-21C is identified by the mesh number of four bytes and the link number of eight bytes. Thus, in the example of FIG. 2B, it is necessary to use twelve bytes of data word to specify one road link. If the calculated route is long, the number of road links that constitute the calculate route becomes large, such as several thousands to several hundred thousand, which requires a large amount of data.

When a vehicle engine is turned-off during the route guidance operation, the navigation system will store the calculated route in a backup memory so that the route guidance can restart when the vehicle is turned-on again. However, as noted above, saving one link requires 12 bytes of map data, and saving the data corresponding to a long route consequently requires a large storage space due to the large data size. Thus, there is a need of a new method and apparatus for efficiently storing the map data on the calculated route in a memory of the navigation system.

SUMMARY OF THE INVENTION

It is, therefore, an object of the present invention to provide a method and apparatus for efficiently storing map data associated with a calculated route to the destination in a small space of a backup memory by dramatically decreasing the required amount of data.

It is another object of the present invention to provide a method and apparatus for efficiently storing the data that is capable of reproducing the calculated route to the destination by converting the map data associated with the calculated route to direction codes.

It is a further object of the present invention to provide a method and apparatus for examining an attribute of each of the road links configuring the calculated route and converting the attributes to predefined direction codes and storing the direction codes in the backup memory of a navigation system.

It is a further object of the present invention to provide a method and apparatus for creating the direction codes that represent the calculated route and storing the direction codes in the backup memory of small storage space so that the calculated route can be reproduced when an operation of the navigation system is restarted.

One aspect of the present invention is a map data storing method for a navigation system. The method includes the steps of: establishing a calculated route to a destination specified by a user; conducting a route guidance operation to guide the user to the destination through the calculated route; converting data representing the calculated route to direction codes and storing the direction codes in a backup memory when the operation of the navigation system is turned-off before reaching the destination; retrieving the direction codes from the backup memory when the operation of the navigation system is turned-on again; establishing a remaining part of the calculated route based on the direction codes retrieved from the backup memory; and restarting the route guidance operation to guide the user to the destination through the calculated route. The direction code represents information on a connection point of each of road links configuring the calculated route by a type of attribute and an amount associated with the attribute.

In the above aspect of the present invention, the map data concerning the calculated route is converted to the direction codes if the navigation operation is terminated before the user reaching the destination. Alternatively, it is also possible that the conversion of the calculated route to the direction codes is conducted as soon as the calculated route is established. Thus, the navigation system creates the direction codes and stores the direction codes in the backup memory without regard to whether the navigation operation is turned-off before reaching the destination or not.

In the map data storing method of the present invention, the step of converting the data representing the calculated route to the direction codes includes a step of examining the connection point of each of the road links configuring the calculated route for determining a command code that represents the type of attribute at the connection point and an operand that represents the amount associated with the attribute.

In the map data storing method of the present invention, a first command code indicates that a plurality of road links are intersected at the connection point with a plurality of different directions and the operand attached to the first command code indicates a direction of the road link of the calculated route at the connection point.

In the map data storing method of the present invention, a second command code indicates that the road links that configure the calculated route shift to a different data layer and the operand attached to the second command code indicates a number of data layers to be shifted from a current data layer.

In the map data storing method of the present invention, a third command code indicates that a plurality of road links that configure the calculated route are serially connected in the same direction in a straight line manner and the operand attached to the third command code indicates a number of road links connected serially by repeating the same direction as that of previous road link.

Another aspect of the present invention is an apparatus for efficiently storing the data associated with the calculated route for implementing the steps defined in the methods of the present invention noted above. The apparatus includes various means to examine the map data concerning the calculated route and convert the data to the predefined direction codes to store them in a backup memory of small storage capacity. The apparatus is able to dramatically decrease the amount of data necessary for reproducing the calculated route, thus, it is also able to dramatically reduce the time to access the backup memory.

According to the present invention, the navigation system is able to efficiently store the map data associated with the calculated route to the destination in a small space of the backup memory by dramatically decreasing the required amount of data. The navigation system examines an attribute of each of the road links configuring the calculated route and converts the attributes to predefined direction codes and stores the direction codes in the backup memory of small storage space. When the navigation system is restarted, the calculated route will be reproduced based on the direction codes retrieved from the backup memory.

The present invention can be advantageously implemented in such a situation where the operation of the navigation system is terminated during the middle of the route guidance operation such as when the vehicle engine is turned-off by the user before reaching the destination. Since each direction code in the present invention requires a small amount of data bit such as two bytes for each road link as opposed to twelve bytes for each road link in the conventional technology, an overall amount of data for the calculated route can be dramatically reduced and can be stored in a small memory space. Because the amount of data required for the direction codes is small, the time required to access the backup memory for writing or reading the direction codes, i.e., the map data for the calculated route, can be dramatically reduced, thereby improving the performances of the navigation system.

BRIEF DESCRIPTION OF THE DRAWINGS

FIG. 2A is a schematic diagram showing an example of image concerning the relationship between road links and nodes for each road in the map data, and FIG. 2B is a table showing an example of assignment of data bit length in the map data for identifying a mesh number and a link number for the road of FIG. 2A.

FIG. 3 is a table showing an example of command bytes and operand bytes configuring direction codes and their meanings incorporated in the present invention for storing the direction codes converted from the calculated route.

FIGS. 4A-4D are schematic diagrams showing road links and connection points thereof to describe the direction coding method under the present invention where FIG. 4A shows a connection point with four directions, and FIG. 4B is a table showing direction codes associated with the connection point shown in FIG. 4A, FIG. 4C shows an example of road links and connection points associated with a calculated route, and FIG. 4D is a table showing direction codes representing the calculated route shown in FIG. 4C.

FIG. 5A shows another example of connection point of the road links more complicated than that of FIG. 4A, and FIG. 5B is a table showing direction codes associated with the connection point shown in FIG. 5A.

FIGS. 7A-7C are flow charts showing examples of operational procedures for converting the calculated route data to the direction codes to be stored in a backup memory under the present invention where FIG. 7A shows an example of basic operation incorporating the direction coding method, FIG. 7B shows an example of detailed operational steps associated with the step 105 in FIG. 7A for creating and storing the direction codes, and FIG. 7C shows another example of basic operation incorporating the direction coding method of the present invention.

DETAILED DESCRIPTION OF THE PREFERRED EMBODIMENT

Figure 1:
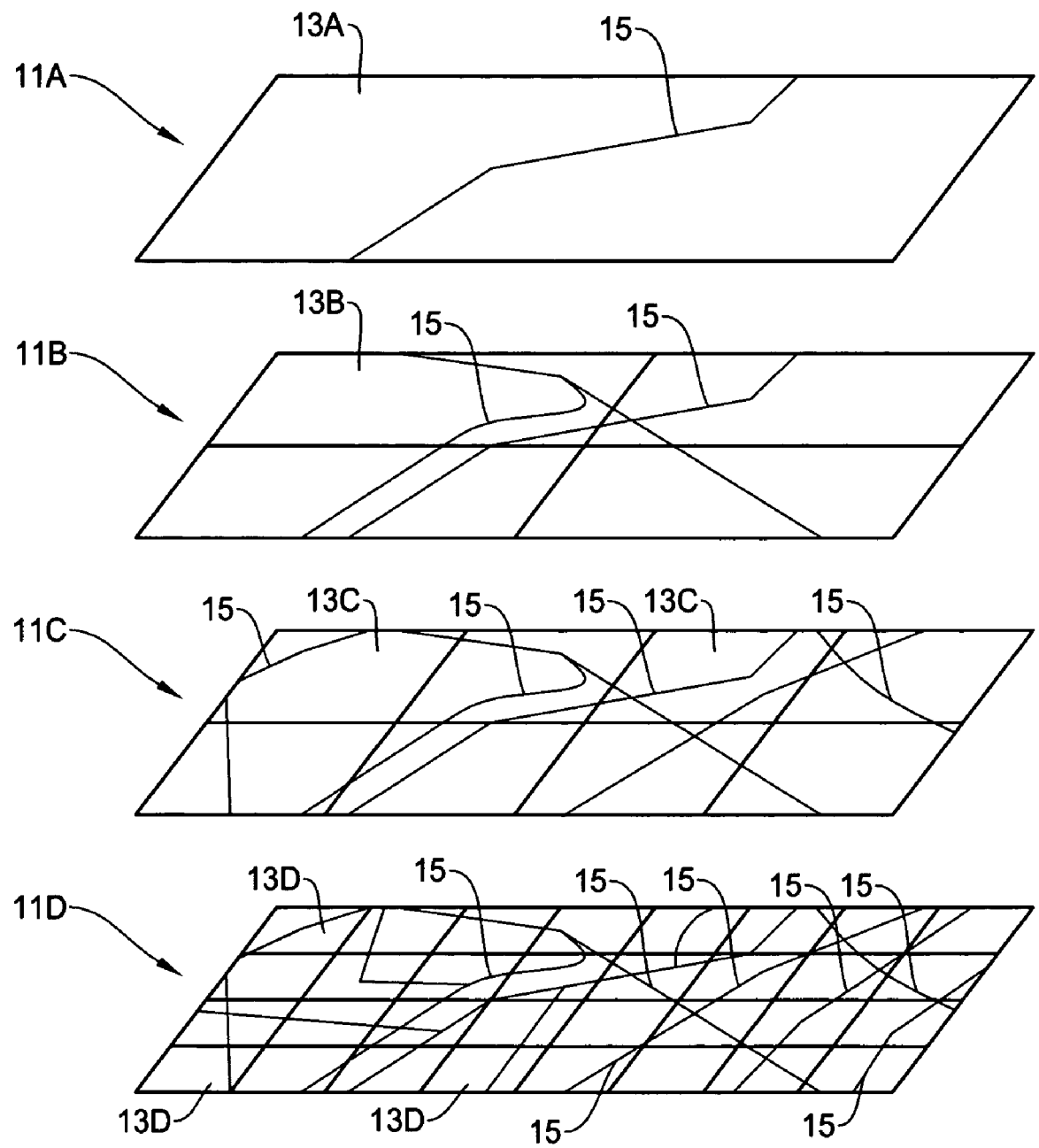
FIG. 1 is a schematic diagram showing an example of multiple layer format of the map data used in the navigation system which includes a plurality of data layers where each data layer is configured by data representing meshes, roads of various classes, and road links, etc.
Figures 2A, 2B:
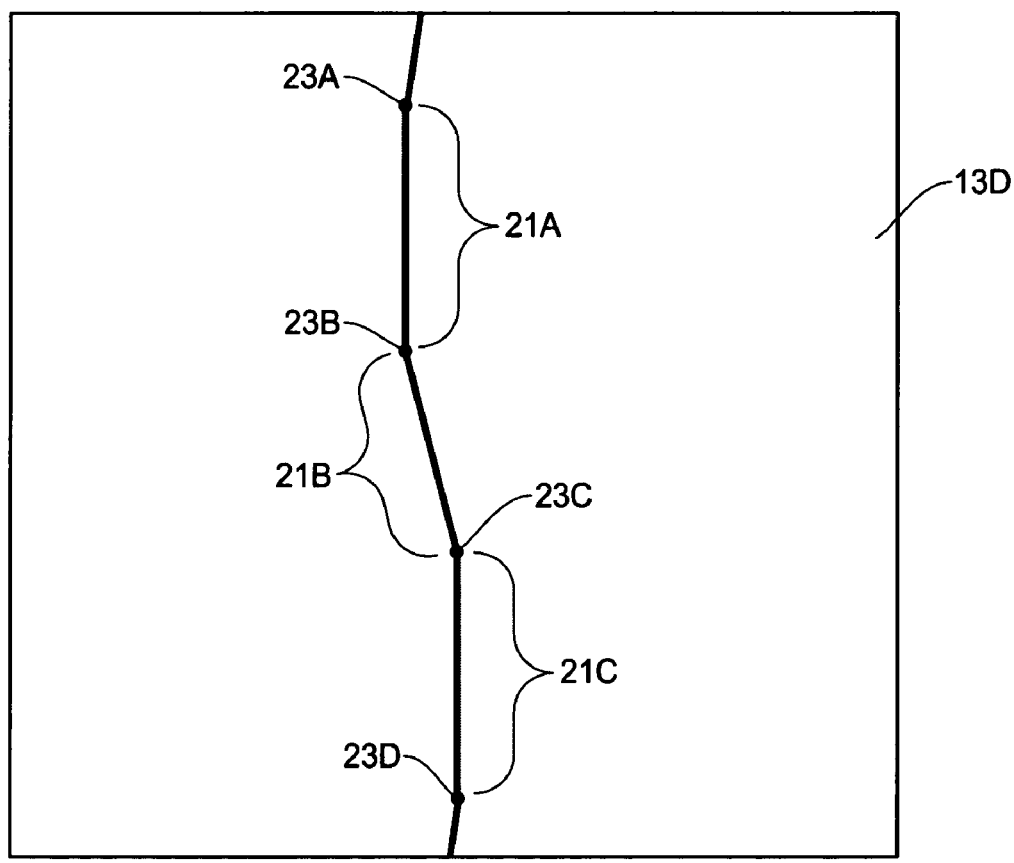
FIGS. 2A and 2B show road links constituting a road where

The method and apparatus of the present invention for efficiently converting and storing the data concerning a calculated route is described in detail with reference to the accompanying drawings. In the following, the description will be made mainly for the case where the map data storing method and apparatus is applied to a vehicle navigation system. However, the method and apparatus for efficiently storing the map data under the present invention can be implemented to other devices having a navigation function to determine a calculated route to the destination, such as portable navigation devices, PDAs, cellular phones, watches, personal computers, etc.

The method and apparatus of the present invention provides a more efficient way of storing map data indicating the calculated route in a relatively small space of a memory. As noted above, such a situation arises when the operation of the navigation system is terminated during the middle of the route guidance operation such as when the vehicle engine is turned-off by the user. Since the user has not reached the destination, the navigation system stores the data concerning the calculated route to the destination in a backup memory to resume the route guidance operation later when the vehicle engine is restarted.

The method and apparatus of the present invention enables to dramatically decrease the size of the data that need to reproduce the calculated route when the navigation system is reactivated by incorporating a direction coding method. In the present invention, rather than storing the mesh number and the link number for each road link which typically requires twelve (12) bytes of data size for each link as noted above, the map data regarding the directions and other attributes at the connection points at the road links and their values are converted to special codes. The converted codes are stored in a backup memory when the navigation operation is turned-off if the destination is not reached and will be retrieved from the backup memory when the navigation operation is turned-on again.

Within the context of the present invention, such a method of specifying the connection points of the road links by the special codes (direction codes) is referred to as a "direction coding method" as will be described in detail with reference to FIGS. 3, 4A-4D, 5A-5B, etc. As noted above, the direction codes stored in the backup memory under the present invention are retrieved when the navigation system is turned-on. Then, the direction codes are decoded to obtain the actual map data from the data storage to establish and display the calculated route on the map image, etc. Since the amount of data that has to be stored in the backup memory and retrieved therefrom is small, it requires only a small storage space of the backup memory and such an operation for storing and retrieving the direction codes can be completed within a short time.

FIG. 3 is a table showing an example of command bytes, operand bytes and their meanings for implementing the direction coding method of the present invention. In this example, each direction code is configured by a command code (command byte) for representing an attribute (an instruction of how to proceed) of the connection point and its value (operand byte) for representing an amount of the attribute. For example, a direction code 161 is formed of a command byte "0000 0001" indicating an attribute "direction" of the connection point of the road links and its operand byte N (0-225) for indicating a specific direction (straight forward, right turn, left turn, etc.) at the connection point.

In a typical connection point, the normal direction code 161 is to specify one of four possible directions at the connection point (node) of road links which will be identified by two bits as explained later. In a more complicated connection point, the direction code is to specify one of more than five directions at the nodes of road links by a pair of two bits (four bits) as explained later. Based on the direction code 161, the navigation system is able to reestablish the direction at each connection point of the road links.

In the example of FIG. 3, a direction code 162 is formed of a set of command byte "0000 0010" and its operand byte L (from −127 to +128). In the direction code 162, the command byte "0000 0010" indicates an attribute "change of data layer" at the connection point and the operand byte L indicates a degree of change in an upper or lower direction of the data layers. As noted above with reference to FIG. 1, the map data concerning the calculated route is configured by a plurality of data layers. Thus, the direction code 162 is used for specifying such a change of data layer where the command byte indicates the attribute "change of data layer" at the connection point (node) of the road links. The negative value of the operand byte (value) expresses the number of data layers lower than the current layer for more detailed map information while the positive value of operand byte expresses the number of data layer higher than the current layer for more simplified map information with a larger covering area.

In the example of FIG. 3, a direction code 163 is formed of a set of command byte "0000 0011" and its operand byte R. In the direction code 163, the command byte "0000 0011" indicates an attribute "repeat same direction as previous one" at the connection point and the operand byte R indicates a number of connection points that repeat the same direction as that of the last connection point. As noted above with respect to the structure of map data, each road is configured by a plurality of road links.

Thus, with respect to a typical road which is substantially straight, there are many chances that a direction at a current connection point of the road link is the same as that of the last connection point. In such a case, the direction code 163 is used for dramatically reducing the amount of data for representing such a straight road on the calculated route since each road is configured by many road links. For examples, if ten road links are connected in a straight manner on the calculated route, the operand byte is 10 in the direction code 163 for repeating the same direction ten times.

It should be noted that the types of the direction code are not limited to the above example, but other types of direction code may also be used as well. For example, a direction code for specifying a mesh of map data on the same data layer may also be used. By the use of the direction codes, the capacity of memory required for storing the data for the calculated route can be drastically reduced, since each direction code (command byte and operand byte) needs only two bytes in total. For a relatively long route, the reduction can be as much as 90% less compared to the conventional method that saves every link ID and mesh ID for storing the calculated route.

When the direction codes stored in the manner described above are to be retrieved, as when the vehicle restarts and the navigation system boots up, the navigation system will decode the direction codes to produce the ordinary map data for the calculated route. The navigation system is able to generate the calculated route by following the direction codes of the calculated route. Due to the small amount of memory space required for saving the calculated route, the time required for I/O access can be reduced as well, thereby further improving the performance of the navigation system.

Figures 4A, 4B:
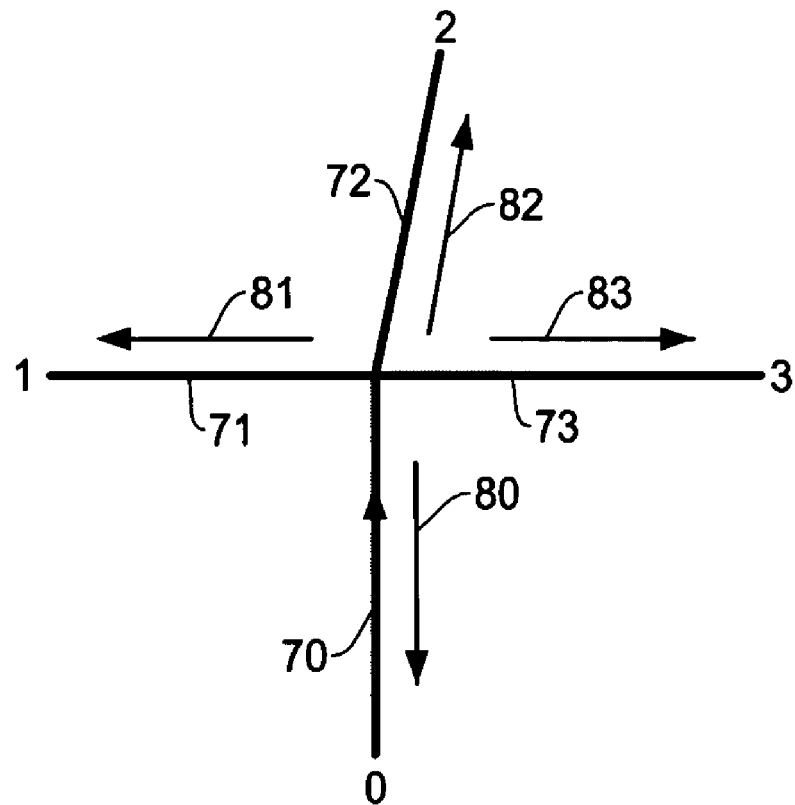

FIGS. 4A-4D are schematic diagrams showing road links and connection points thereof to describe the direction coding method under the present invention. FIG. 4A shows a normal situation of connection point of the road links with four directions, and FIG. 4B is a table showing direction codes associated with the connection point of FIG. 4A. In the example of FIG. 4A, a road link 70 is a current link where, at the end of the link 70, road links 71, 72, and 73 are respectively connected.

In an actual application to the calculated route, the connection point of the road links represented in FIG. 4A corresponds to a typical intersection with four directions. The direction arrows 80-83 of the road link 70-73 at the connection point are identified by corresponding values (operand) 0-3. The direction code 161 (FIG. 3) incorporates such a value along with the command code which indicates the attribute "direction".

In the example of FIG. 4A, the direction shown by the arrow 80 for the road link 70 is assigned to a value "0", which represents a U-turn. Similarly, the direction shown by the arrow 81 for the road link 71 is assigned to a value "1", which represents a left turn. The direction shown by the arrow 82 for the road link 72 is assigned to a value "2", which is heading straight (upward). Finally, the direction shown by the arrow 83 for the road link 73 is assigned to a value "3", which represents a right turn.

As noted above, in this example, the possibility of next direction associated with the road link 70 on the calculated route is limited to four directions. Since there are only four possible directions, only two (2) bits will be sufficient in the operand byte to indicate the specific directions. FIG. 4B shows a table listing the direction codes associated with the connection point of FIG. 4A in which each of the road links 71-73 is indicated by the same command byte "0000 0001" while the operand byte shows the values 0-3, respectively.

Figure 4C:
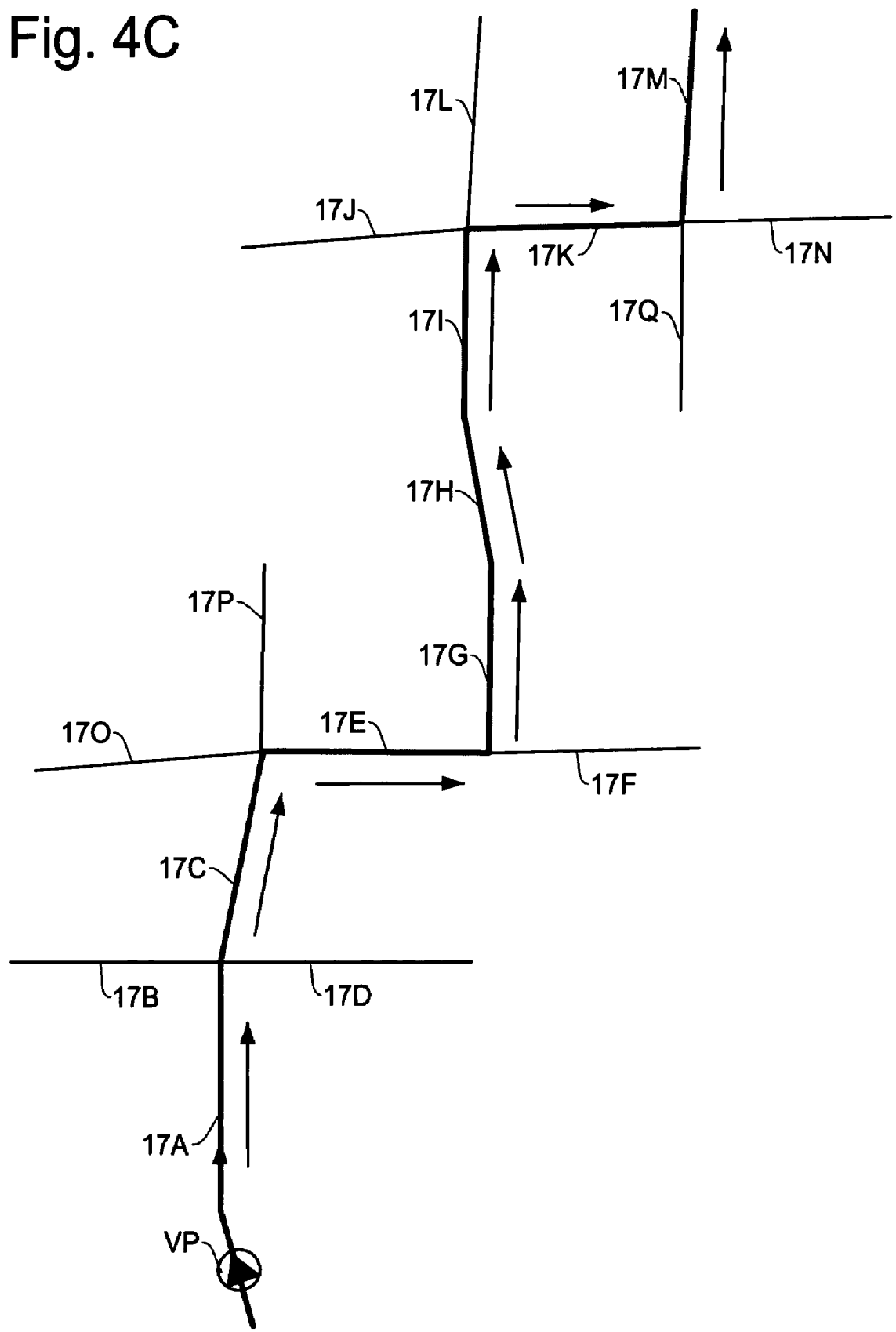

FIG. 4C shows an example of road links and connection points associated with a calculated route where all of directions at the connection points are configured by the type of intersection with four or less directions shown in FIG. 4A. In the example of FIG. 4C, a current vehicle position is denoted by a label VP and the calculated route to the destination is illustrated by the bold (highlighted) line on the road links. Among the road links 17A-17Q, only the road links that configure the calculated route are examined to create the direction codes.

The direction codes are listed in the table of FIG. 4D which represent the road links constituting the calculated route of FIG. 4C. In the example FIG. 4D, the operand byte of the road links 17A and 17C is "2" since the direction at the connection points for the both road links is "head straight (upward)". With respect to the road link 17E, since the road link 17E is a right turn at the connection point with the road link 17C, the operand byte shows the value "3". In a similar manner, the road links 17K and 17M on the calculated route are converted to the direction codes.

With respect to the road links 17H and 17I, since the direction of these links is the same as the last road link 17G as being connected in a straight line manner, the direction code 163 (FIG. 3) is used which includes the command byte "0000 0011" and the operand byte "2" which shows the number of repeating the same direction. As noted above, the direction code 161 (FIG. 3) is used for all the other links to specify the direction at each connection point. In this manner, the calculated route is converted to the direction codes each being configured by two (2) byte data to be stored in a backup memory.

Figures 5A, 5B:
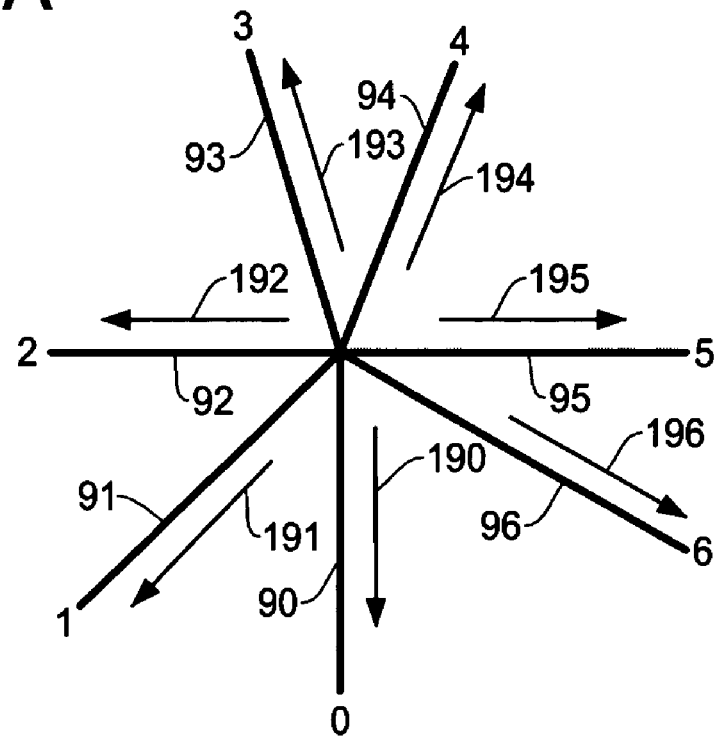
FIGS. 5A and 5B are schematic diagrams showing road links and connection point thereof to describe the direction coding method under the present invention where

FIGS. 5A and 5B are schematic diagrams showing road links and connection points thereof to describe the direction coding method under the present invention. FIG. 5A shows another example of connection point which is more complicated than that of FIG. 4A because it has seven different directions. FIG. 5B is a table showing the direction codes associated with the connection point shown in FIG. 5A for representing the seven directions.

In most cases, a length of two (2) bits is sufficient for specifying the value (operand) for each direction as described above with reference to FIGS. 4A and 4B since the road links of four or less are connected. However, there may arise a situation where a connection point of the road links is more complicated by having five or more links (directions) as shown in FIG. 5A. In the example of FIG. 5A, at the end of a current road link 90, six road links 91-96 with different directions are respectively connected, thereby including seven possible directions at the connection point.

In the example of FIG. 5A, the direction shown by the arrow 190 for the link 90 is assigned to a value "0", which represents a U-turn. The direction shown by the arrow 191 for the link 91 is assigned to a value "1", and the direction shown by the arrow 192 for the link 92 is assigned to a value "2", which represents a left turn. The direction shown by the arrow 193 for the link 93 is assigned to a value "3", and the direction shown by the arrow 194 for the link 94 is assigned to a value "4". The direction shown by the arrow 195 for the link 95 is assigned to a value "5", which represents a right turn. Finally, the direction shown by the arrow 196 for the link 96 is assigned to a value "6".

Because more than four possible directions exist, unlike the case of FIGS. 4A-4D, the single pair of two (2) bits is insufficient and needs additional data bits for the operand (value) of the direction code. For example, in the present invention, another pair of two (2), i.e., total of four (4) bits may be preferably used in the operand of the direction code to specify a particular direction of the road link. For example, "0110" means a value "6" as is well known in the art, which specifies the direction of the link 96 in the example of FIG. 5A.

FIG. 5B shows a table listing the direction codes associated with the connection point of FIG. 5A in which each of the links 90-96 is indicated by the same command byte "0000 0001" while the operand byte shows the values 0-6, respectively. As noted above, the command byte "0000 0001" indicates the attribute "direction" and the operand byte (value) indicates a specific direction at the connection point. Although the intersection depicted in FIGS. 5A and 5B is uncommon, the storage method under the present invention is able to store the calculated route even when such complex intersections are involved.

Figure 6A:
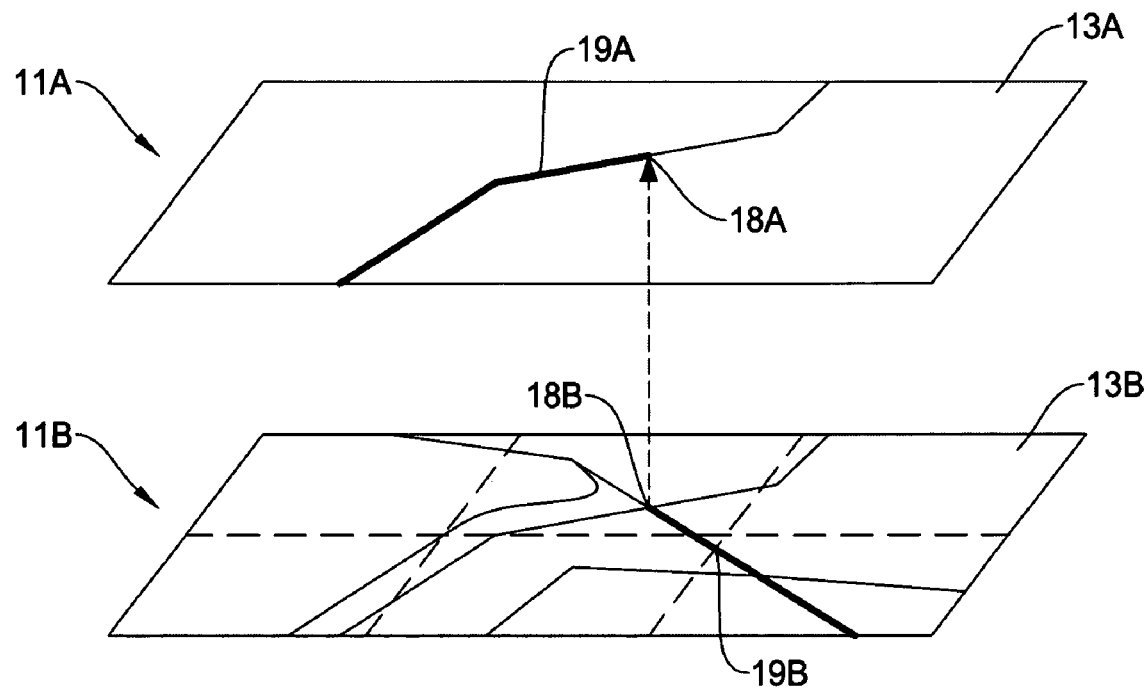
FIGS. 6A and 6B are schematic diagrams showing the relationship between different layers or mesh portions of the map data in the direction coding method of the present invention where the route changes between a lower data layer and a higher data layer in FIG. 6A while the route extends toward another mesh portion in FIG. 6B.
Figure 6B:
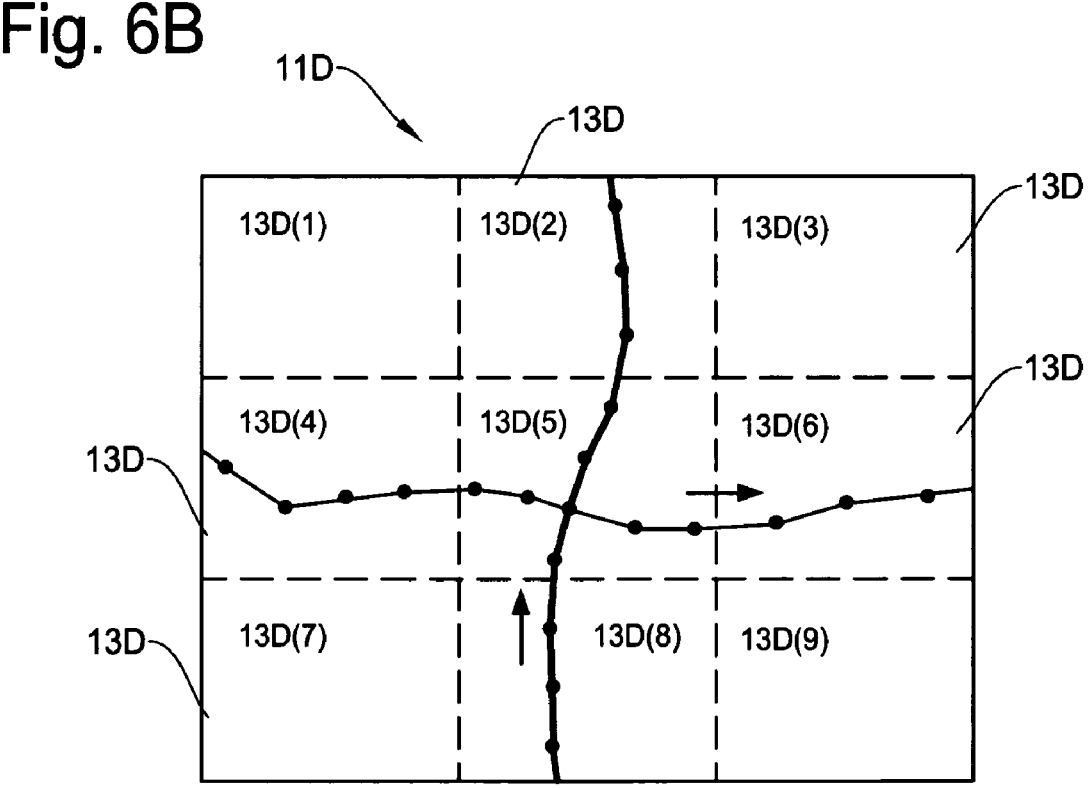

FIGS. 6A and 6B are schematic diagrams showing the relationship between different layers or mesh portions of the map data in the direction coding method of the present invention. In FIG. 6A, the road link of the calculated route is shifted between a lower layer and an upper layer of the map data. In FIG. 6B, the road links of the calculated route extend to the road links of another mesh portion on the same layer of the map data.

As described with reference to the table of FIG. 3, the direction code 162 indicates the change of map data layer with respect to the road links on the calculated route. When the direction code of the present invention shows the command byte "0000 0010", the road link on the calculated route changes its data layer to a road link on a level indicated by the operand byte (value) L. As noted with reference to FIG. 1, the map data in the higher data layer is more simplified while the size of the mesh portion becomes larger than that of the lower layer. Thus, the amount of data for the direction codes can be further reduced by shifting the layer to the higher data layer whenever possible.

In the example of FIG. 6A, the direction code indicates that the map data regarding the calculated route shifts from a point 18B of a road link 19B on the data layer 11B to a point 18A of a road link 19A on the data layer 11A. Since the higher data layer typically deals with higher class roads such as freeways in a mesh portion 13A which is larger than the mesh 13B on the layer 11B, the amount of data of the direction codes on the higher layer can be further decreased. As shown in the example of FIG. 6B, it is also possible to incorporate a direction code that indicates changes of mesh portions 13D on the same data layer 11D although a specific direction code for such a purpose is not described in the foregoing.

Figure 7A:
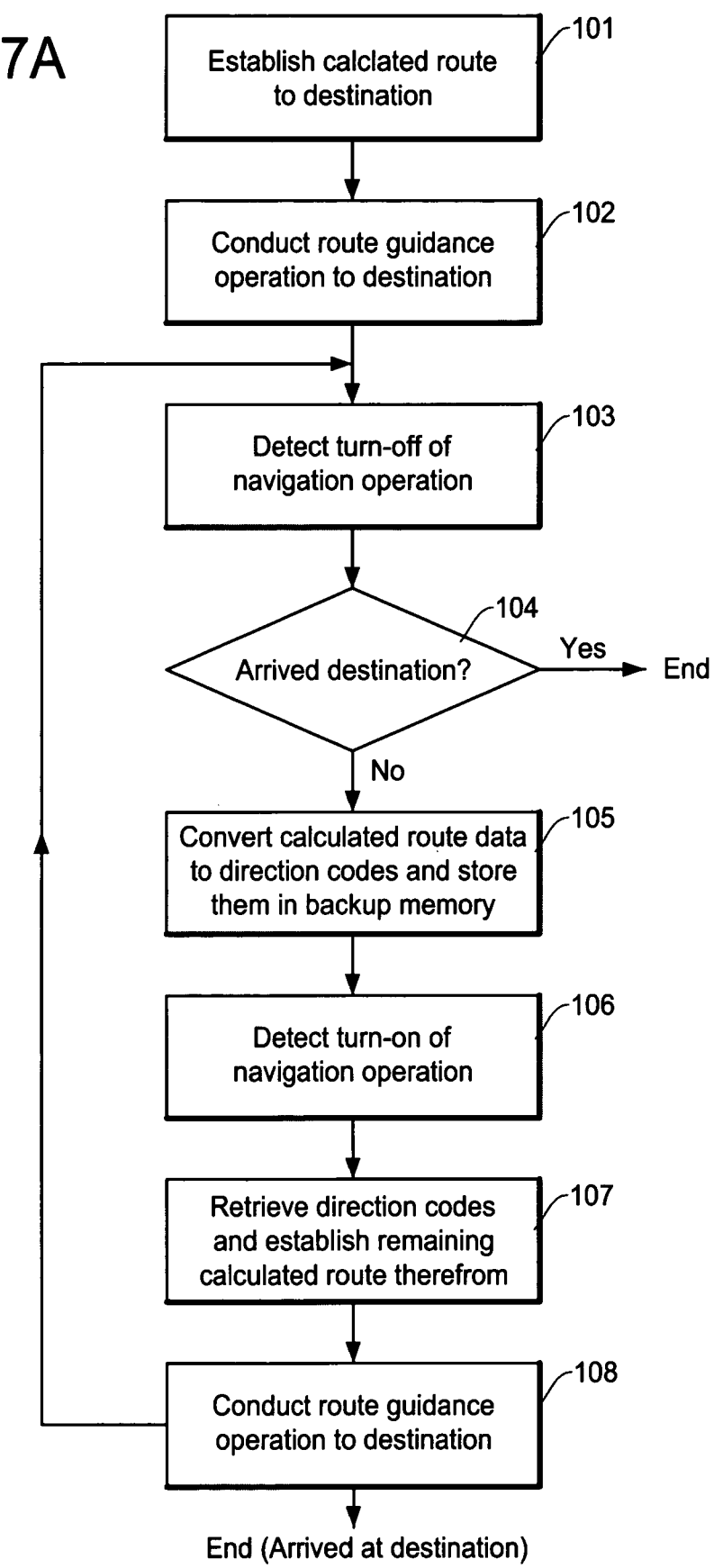
Figure 7B:
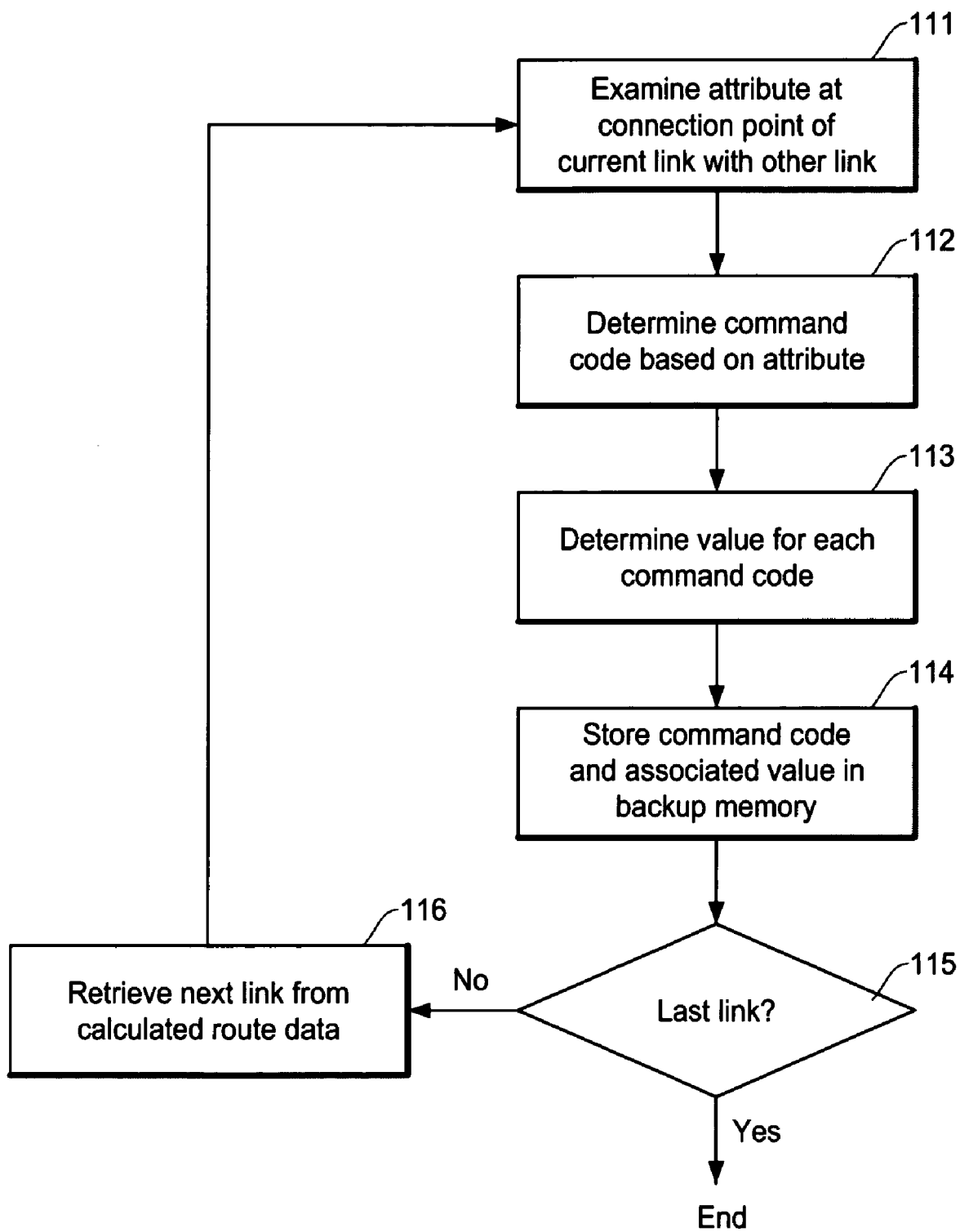

FIGS. 7A-7C are flow charts showing examples of operational procedures for converting the calculated route data to the direction codes to be stored in a backup memory under the present invention. FIG. 7A shows an example of basic operation incorporating the direction coding method in the operation of the navigation system, and FIG. 7B shows an example of detailed operational steps associated with the step 105 in FIG. 7A for creating and storing the direction codes. FIG. 7C shows another example of basic operation incorporating the direction coding method in the operation of the navigation system.

In the flow chart of FIG. 7A, based on a destination specified by the user, the navigation system establishes a calculated route to the destination in the step 101. The calculated route is determined based on predefined methods such as selecting; the shortest way to reach the destination, the route preferring freeways to surface roads, the least expensive way to the destination, or the route without using toll road, and the like. Then, in the step 102, the navigation system conducts the route guidance operation to guide the user to the destination on the calculated route.

Suppose the user turns-off the vehicle engine or otherwise terminates the route guidance operation, the navigation system detects such turn-off of the navigation operation in the step 103. When the navigation operation is turned-off in this manner, the navigation system checks whether the user has already arrived at the destination in the step 104. This step is to determine whether the route guidance operation should be resumed when the navigation operation is turned-on again later since it is necessary to continue the route guidance operation if the destination is not reached.

Thus, if it is determined in the step 104 that the user has already arrived at the destination, the process ends. If the user has not arrived at the destination, the process moves to the step 105 where the navigation system converts the map data regarding the remaining calculated route to a series of direction codes of the present invention and stores the direction codes in a backup memory. As noted above, since each direction code in the present invention requires a small amount of data bit such as two bytes for each road link as opposed to twelve bytes for each road link in the conventional technology, an overall amount of data for the calculated route can be dramatically reduced and can be stored in a memory of small storage capacity.

Suppose the user turns-on the vehicle engine or otherwise activates the route navigation operation, the navigation system detects such turn-on of the navigation operation in the step 106. Then, in the step 107, the navigation system retrieves the direction codes from the backup memory to reestablish the remaining calculated route through decoding the direction codes. Then, in the step 108, the navigation system starts the route guidance operation again to guide the user to the destination along the calculated route.

The process ends if the user has arrived at the destination while the process returns to the step 103 if the navigation operation is terminated before reaching the destination. Thus, the process from the step 103 to the step 108 may be repeated in such a situation where the user's destination is located far away from the start point so that it takes several days of driving until reaching there. Since the amount of data required for the direction codes is small, the time to access the backup memory for writing or reading the direction codes can be dramatically reduced compared with the conventional technology, which improves the performance of the navigation system.

FIG. 7B is a flow chart that describes an example of operational steps of the present invention for conducting the step 105 in the process of FIG. 7A. In the step 105 of FIG. 7A, the navigation system converts the map data regarding the calculated route to a series of direction codes 161-163 of the present invention and stores the direction codes in the backup memory. As noted above, each direction code is configured by the command code and the value (operand) determined in the steps 112 and 113.

Basically, the process of generating the direction codes 161-163 is conducted by examining the attribute at each connection point of the road links and determining the command code representing the attribute and its value (operand). In the step 111 of FIG. 7B, the navigation system examines an attribute at a connection point of the current road link with other road link. As noted above with reference to FIG. 3, such attributes include "direction" where two or more road links intersect with one another so that the direction on the calculated route must be specified.

Another examples of attribute include "change of data layer" which is directed to the case where the map data layer be shifted either upwardly or downwardly, and "repeat same direction as previous one" which is directed to the case where two or more road links are connected in a straight line manner on the calculated route. Based on the attribute at the connection point, the navigation system determines a command code representing the attribute in the step 112.

As noted above with reference to the table of FIG. 3, the command code of one byte is assigned to each of the direction codes 161-163. For example, as shown in the table of FIG. 3, the data structure of the command code of the direction code 161 for representing the attribute "direction" at the intersection is "0000 0001", the command code of the direction code 162 for representing the attribute "change of data layer" is "0000 0010", and the command code of the direction code 163 for representing the attribute "repeat same direction as previous one" is "0000 0011".

In the step 113, the navigation system determines a value (operand) for each direction code based on the actual direction, number, etc., associated with attribute at the connection point of the road links on the calculated route. For example, with respect to the attribute "direction" involved in the example in FIG. 4A, one of the four directions of the road links 70-73 is specified by the value 0, 1, 2, or 3 for the command code "0000 0001" as shown in the table of FIG. 4B which is typically done by two bits. In the example of FIG. 5A, four bits of operand byte may be used to specify one of the seven directions involved in the intersection as shown in the table of FIG. 5B.

With respect to the attribute "change data layer", the value indicates the number of data layers that has to be shifted either upwardly or downwardly as noted above with reference to the table of FIG. 3 and the map image of FIG. 6A. With respect to the attribute "repeat same direction as previous one", the value indicates the number of road links that are series connected in the same direction as in the manner shown in FIG. 4C (links 17G, 17H and 17I).

In the step 114, the direction codes (command codes and associated values) created in the steps 112 and 113 are stored in the backup memory. In the step 115, the navigation system determines whether the current road link is the last link on the calculated route, and if so, the process ends. If the current road link is not the last link, the process moves to the step 116 to retrieve the next road link on the calculated route and repeats the steps 111-115 noted above until all the information on the road links of the calculated route are converted to the direction codes of the present invention.

As noted above, in the example of FIG. 7A, the map data concerning the calculated route is converted to the direction codes if the navigation operation is terminated before the user reaching the destination. In the operation of FIG. 7C, however, the conversion of the calculated route to the direction codes is conducted as soon as the calculated route is established. Thus, in FIG. 7C, the navigation system creates the direction codes and stores the direction codes in the backup memory without regard to whether the navigation operation is turned-off before reaching the destination or not.

In the flow chart of FIG. 7C, based on a destination specified by the user, the navigation system establishes a calculated route to the destination in the step 121. Then, in the step 122, the navigation system conducts the route guidance operation to guide the user to the destination on the calculated route. As soon as the calculated route is established in the step 121, the navigation system converts the information on the road links involved in the calculated route to the direction codes of the present invention and store them in the backup memory in the step 123. The operation in this step is basically the same as that of the step 105 of FIG. 7A, the details of which have been described with reference to FIG. 7B.

Suppose the user turns-off the vehicle engine or otherwise terminates the navigation operation, the navigation system detects such turn-off of the navigation operation in the step 124. When the navigation operation is turned-off in this manner, the navigation system checks whether the user has already arrived at the destination in the step 125. This step is to determine whether the route guidance operation should be resumed when the navigation operation is turned-on again later since it is necessary to continue the route guidance operation if the destination is not reached.

Thus, if it is determined in the step 125 that the user has already arrived at the destination, the process ends. If the user has not arrived at the destination, and if the user turns-on the vehicle engine or otherwise activates the route navigation operation again, the process moves forward. Namely, the navigation system detects such turn-on of the navigation operation in the step 126. In the step 127, the navigation system retrieves the direction codes from the backup memory to reestablish the calculated route to the destination with use of the direction codes. Then, in the step 128, the navigation system starts the route guidance operation to guide the user to the destination along the calculated route.

The process ends if the user has arrived at the destination while the process returns to the step 124 if the navigation operation is terminated before reaching the destination. Thus, the process from the step 124 to the step 128 may be repeated in such a situation where the user's destination is located far away from the start point so that it takes several days of driving until reaching the destination. Since the amount of data required for the direction codes is small, the time to access the backup memory for writing or reading the direction codes, i.e., the data for reproducing the calculated route, can be dramatically reduced, thereby improving the performances of the navigation system.

Figure 8:
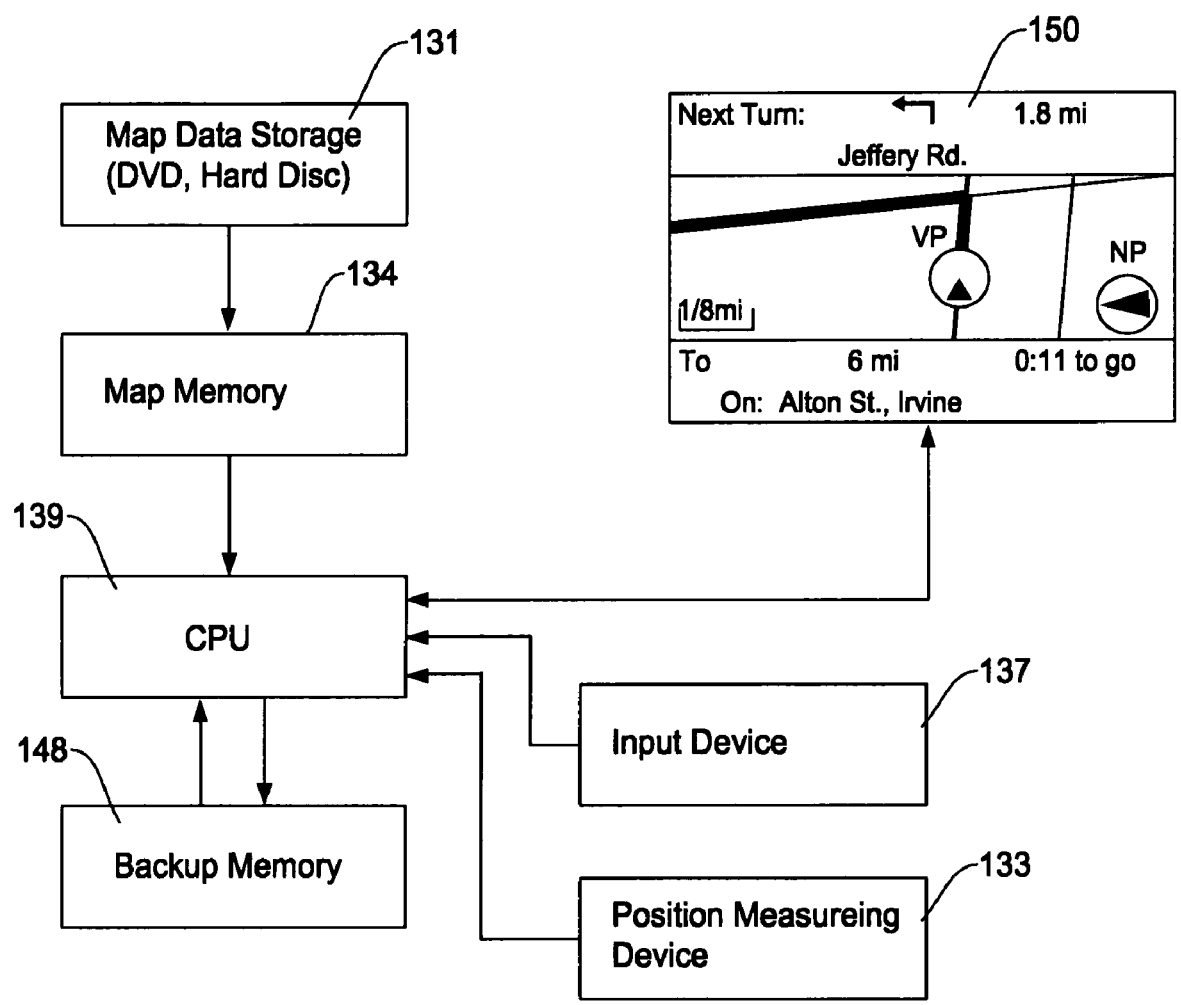
FIG. 8 is a functional block diagram showing an example of basic structure of the apparatus of the present invention for achieving the efficient storage of the calculated route for the navigation system.

FIG. 8 is a functional block diagram showing an example of basic structure of the apparatus for achieving the efficient storage of the data concerning the calculated route to the destination for the navigation system. The structure of FIG. 8 is applicable to any electronic device having a navigation function which enables the electronic device to guide the user to a particular location as noted above. The apparatus of the present invention for efficient storage of the calculated route includes a monitor 150 for interfacing with the user, and a controller (CPU) 139 for controlling an overall operation of the navigation system including the method of the present invention.

The block diagram of FIG. 8 further includes a map data storage 131 such as a DVD or a hard disc for storing map data, a map memory 134 for storing a required portion of the map data retrieved from the map data storage 131, an input device 137 for the user to specify a destination, etc., such as a keypad or a remote controller, a position measuring device 133 for detecting a current position of the user and arrival at the destination, etc. for a route guidance operation, and a backup memory 148 for storing the direction codes of the present invention for reproducing the calculated route to the destination.

In FIG. 8, the apparatus of the present invention is able to retrieve the map data from the map data storage 131 and map memory 134 for establishing a calculated route to the destination which is specified through the input device 137. Based on the retrieved map data, the apparatus displays the map image on the monitor 150 that includes the calculated route which is highlighted during the route guidance operation. If the apparatus implementing the present invention has a communication capability either through wire or wireless, such map data can be retrieved from a remote data server. The CPU 139 controls an overall operation of establishing the calculated route, conducting the route guidance operation, and converting the data to the direction codes of the present invention for efficient storage in the backup memory 148, etc.

As soon as the destination is specified by the user through the operation of the input device 137 or touching an object on the screen, etc., the CPU 139 retrieves the map data from the map data storage 131 and the map memory 134 to establish a calculated route to the destination. The CPU 139 controls the navigation system to conduct the route guidance operation to guide the user to the destination along the calculated route. If the user turns-off the vehicle engine or otherwise deactivates the navigation operation, the CPU 39 detects such turn-off of the navigation operation.

When the navigation operation is turned-off, the CPU 139 checks whether the user has already arrived at the destination based on the signals from the position measuring device 133. This is to determine whether the route guidance operation should be resumed when the navigation operation is turned-on since it is necessary to continue the route guidance operation if the destination is not reached. Thus, if the user has not arrived at the destination, the CPU 139 converts the map data regarding the road links constituting the calculated route to a series of direction codes of the present invention and stores the direction codes in the backup memory 148.

Suppose the user turns-on the vehicle engine or otherwise activates the route guidance operation, the CPU 139 detects such turn-on of the navigation operation. Thus, the CPU 139 retrieves the direction codes from the backup memory 148 to reestablish the remaining calculated route with use of the direction codes. Then, the navigation system starts the route guidance operation to guide the user to the destination along the calculated route.

As noted above, each direction code in the present invention requires a small amount of data bit such as two bytes for each road link as opposed to twelve bytes for each road link in the conventional technology, an overall amount of data for the calculated route can be dramatically reduced and can be stored in a small memory space. Since the amount of data required for the direction codes is small, the time required to access the backup memory for writing or reading the direction codes, i.e., the map data for the calculated route, can be dramatically reduced.

Figure 9:
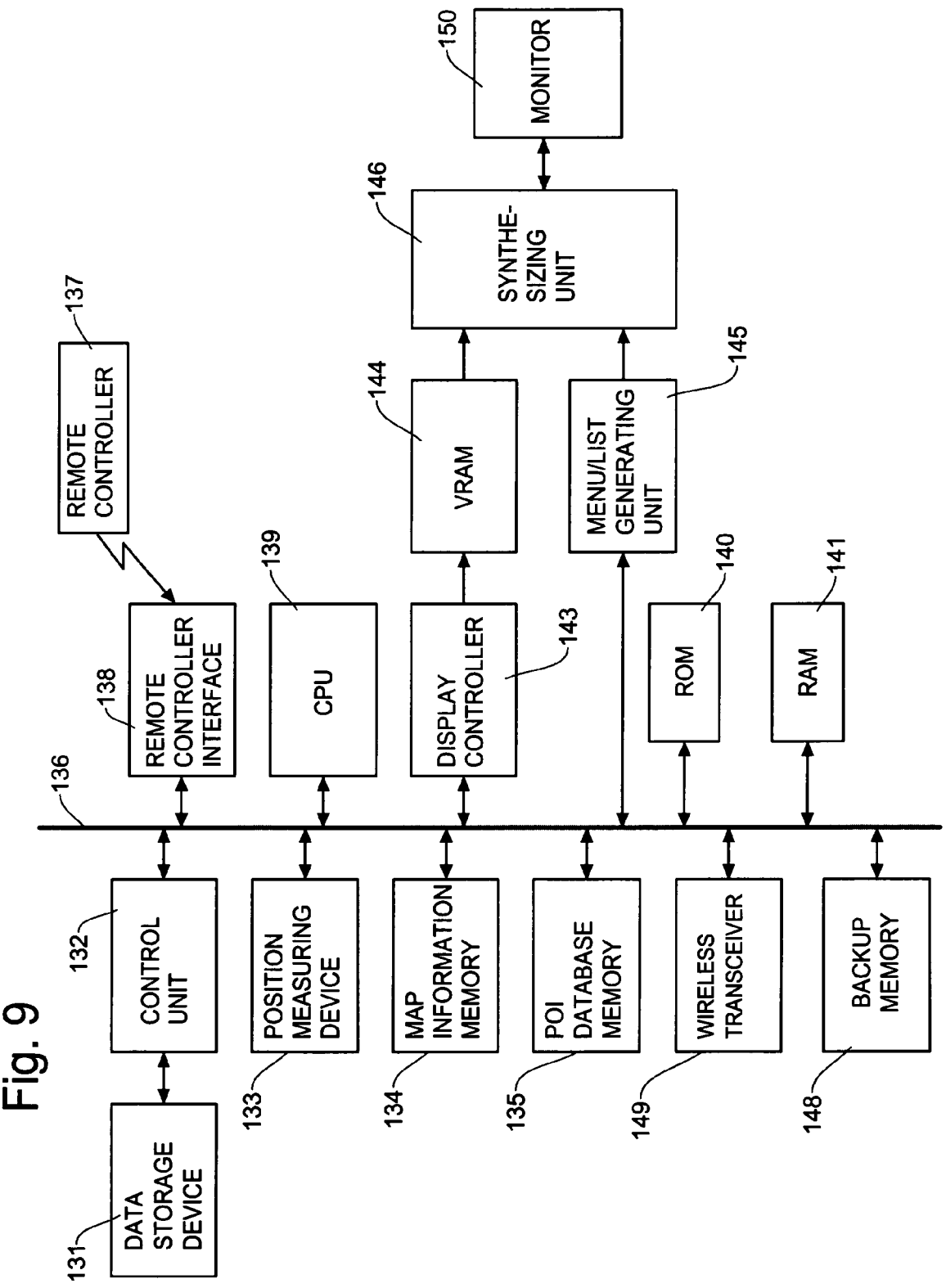
FIG. 9 is a functional block diagram showing an example of structure of a vehicle navigation system implementing the efficient route storage method under the present invention.

FIG. 9 shows an embodiment of the structure of a vehicle navigation system for implementing the method of the present invention for efficiently storing the calculated route. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the functional blocks identical to that of FIG. 8 are denoted by the same reference numerals. The navigation system includes a map data storage 131 such as a hard disc, CD-ROM, DVD or other storage means for storing the map data. The navigation system includes a control unit 132 for controlling an operation for reading the information from the map data storage 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for determining a position based on GPS signals.

The block diagram of FIG. 9 further includes a map information memory 134 for storing the map information which is read from the map data storage 131, a database memory 135 for storing database information such as point of interest (POI) information which is read out from the map data storage 131, a remote controller 137 for executing a menu selection operation, an enlarge/reduce operation, a destination input operation, etc. and a remote controller interface 138. Although a remote controller 137 is a typical example for selecting menus, executing selected functions and etc., the navigation system includes various other input methods to achieve the same and similar operations done through the remote controller.

In FIG. 9, the navigation system further includes a bus 136 for interfacing with the above noted function blocks in the navigation system, a processor (CPU) 139 for controlling an overall operation of the navigation system, a ROM 140 for storing various control programs such as a route search program and a map matching program necessary for navigation control, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a backup memory 148 for storing the direction codes converted from the calculated route, and a monitor (display) 150.

The CPU 139 controls an overall operation of the navigation system including the efficient storage of the calculated route in accordance with the present invention by converting the calculated route data to the direction codes, storing the direction codes in the backup memory 148, reestablishing the calculated route based on the direction codes retrieved from the backup memory 148, etc. A program that performs the procedure described in the flow charts of FIGS. 7A-7C are stored in the ROM 140 or other storage medium and is executed by the CPU 139.

As has been described above, according to the present invention, the navigation system is able to efficiently store the map data associated with the calculated route to the destination in a small space of the backup memory by dramatically decreasing the required amount of data. The navigation system examines an attribute of each of the road links configuring the calculated route and converts the attributes to predefined direction codes and stores the direction codes in the backup memory of small storage space. When the navigation system is restarted, the calculated route will be reproduced based on the direction codes retrieved from the backup memory.

The present invention can be advantageously implemented in such a situation where the operation of the navigation system is terminated during the middle of the route guidance operation such as when the vehicle engine is turned-off by the user before reaching the destination. Since each direction code in the present invention requires a small amount of data bit such as two bytes for each road link as opposed to twelve bytes for each road link in the conventional technology, an overall amount of data for the calculated route can be dramatically reduced and can be stored in a small memory space. Because the amount of data required for the direction codes is small, the time required to access the backup memory for writing or reading the direction codes, i.e., the map data for the calculated route, can be dramatically reduced, thereby improving the performances of the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A map data storing method for a navigation system, comprising the following steps of:
   establishing a calculated route to a destination specified by a user;
   conducting a route guidance operation to guide the user to the destination through the calculated route;
   converting data representing the calculated route to direction codes and storing the direction codes in a backup memory when the operation of the navigation system is turned-off before reaching the destination;
   retrieving the direction codes from the backup memory when the operation of the navigation system is turned-on again;
   establishing a remaining part of the calculated route based on the direction codes retrieved from the backup memory; and
   restarting the route guidance operation to guide the user to the destination through the calculated route;
   wherein the direction code includes a command code and an operand, and wherein the command code provides instruction of how to proceed to a next node, and the operant indicates a numeric value to further specify the instruction of the command code.

2. A map data storing method for a navigation system as defined in claim 1, further includes a step of detecting that the operation of the navigation system is turned-off, and a step of detecting that the operation of the navigation system is turned-on.

3. A map data storing method for a navigation system as defined in claim 1, where said step of converting the data representing the calculated route to the direction codes includes a step of examining the connection point of each of the road links configuring the calculated route for determining the command code that points to the next node of the next link without uniquely identifying by a link number or node number.

4. A map data storing method for a navigation system as defined in claim 3, wherein a first command code indicates that a plurality of road links are intersected at the connection point with a plurality of different directions and the operand attached to the first command code indicates a direction of the road link of the calculated route at the connection point.

5. A map data storing method for a navigation system as defined in claim 4, wherein a second command code indicates that the road links that configure the calculated route shift to a different data layer and the operand attached to the second command code indicates a number of data layers to be shifted from a current data layer.

6. A map data storing method for a navigation system as defined in claim 4, wherein a third command code indicates that a plurality of road links that configure the calculated route are serially connected in the same direction in a straight line manner and the operand attached to the third command code indicates a number of road links connected serially by repeating the same direction as that of previous road link.

7. A map data storing method for a navigation system, comprising the following steps of:
   establishing a calculated route to a destination specified by a user;
   converting data representing the calculated route to direction codes and storing the direction codes in a backup memory;
   conducting a route guidance operation to guide the user to the destination through the calculated route;
   retrieving the direction codes from the backup memory when the operation of the navigation system is turned-on again after it has been turned-off before arriving at the destination;
   establishing a remaining part of the calculated route based on the direction codes retrieved from the backup memory; and
   restarting the route guidance operation to guide the user to the destination through the calculated route;
   wherein the direction code includes a command code and an operand, and wherein the command code provides instruction of how to proceed to a next node, and the operant indicates a numeric value to further specify the instruction of the command code.

8. A map data storing method for a navigation system as defined in claim 7, further includes a step of detecting that the operation of the navigation system is turned-off, and a step of detecting that the operation of the navigation system is turned-on.

9. A map data storing method for a navigation system as defined in claim 7, where said step of converting the data representing the calculated route to the direction codes includes a step of examining the connection point of each of the road links configuring the calculated route for determining the command code that points to the next node of the next link without uniquely identifying by a link number or node number.

10. A map data storing method for a navigation system as defined in claim 9, wherein a first command code indicates that a plurality of road links are intersected at the connection point with a plurality of different directions and the operand attached to the first command code indicates a direction of the road link of the calculated route at the connection point.

11. A map data storing method for a navigation system as defined in claim 10, wherein a second command code indicates that road links that configure the calculated route shift to a different data layer and the operand attached to the second command code indicates a number of data layers to be shifted from a current data layer.

12. A map data storing method for a navigation system as defined in claim 10, wherein a third command code indicates that a plurality of road links that configure the calculated route are serially connected in the same direction in a straight line manner and the operand attached to the third command code indicates a number of road links connected serially by repeating the same direction as that of previous road link.

13. A map data storing apparatus for a navigation system, comprising:
- means for establishing a calculated route to a destination specified by a user;
- means for conducting a route guidance operation to guide the user to the destination through the calculated route;
- means for converting data representing the calculated route to direction codes and storing the direction codes in a backup memory when the operation of the navigation system is turned-off before reaching the destination;
- means for retrieving the direction codes from the backup memory when the operation of the navigation system is turned-on again;
- means for establishing a remaining part of the calculated route based on the direction codes retrieved from the backup memory; and
- means for restarting the route guidance operation to guide the user to the destination through the calculated route;
- wherein the direction includes a command code and an operand, and wherein the command code provides instruction of how to proceed to a next node, and the operant indicates a numeric value to further specify the instruction of the command code.

14. A map data storing apparatus for a navigation system as defined in claim 13, further includes means for detecting that the operation of the navigation system is turned-off, and means for detecting that the operation of the navigation system is turned-on.

15. A map data storing apparatus for a navigation system as defined in claim 13, where said means for converting the data representing the calculated route to the direction codes includes means for examining the connection point of each of the road links configuring the calculated route for determining the command code that points to the next node of the next link without uniquely identifying by a link number or node number.

16. A map data storing apparatus for a navigation system as defined in claim 15, wherein a first command code indicates that a plurality of road links are intersected at the connection point with a plurality of different directions and the operand attached to the first command code indicates a direction of the road link of the calculated route at the connection point.

17. A map data storing apparatus for a navigation system as defined in claim 15, wherein a second command code indicates that the road links that configure the calculated route shift to a different data layer and the operand attached to the second command code indicates a number of data layers to be shifted from a current data layer.

18. A map data storing apparatus for a navigation system as defined in claim 15, wherein a third command code indicates that a plurality of road links that configure the calculated route are serially connected in the same direction in a straight line manner and the operand attached to the third command code indicates a number of road links connected serially by repeating the same direction as that of previous road link.

19. A map data storing apparatus for a navigation system, comprising:
- means for establishing a calculated route to a destination specified by a user;
- means for converting data representing the calculated route to direction codes and storing the direction codes in a backup memory;
- means for conducting a route guidance operation to guide the user to the destination through the calculated route;
- means for retrieving the direction codes from the backup memory when the operation of the navigation system is turned-on again after it has been turned-off before arriving at the destination;
- means for establishing a remaining part of the calculated route based on the direction codes retrieved from the backup memory; and
- means for restarting the route guidance operation to guide the user to the destination through the calculated route;
- wherein the direction code includes a command code and an operand, and wherein the command code provides instruction of how to proceed to a next node, and the operant indicates a numeric value to further specify the instruction of the command code.

20. A map data storing apparatus for a navigation system as defined in claim 19, further includes means for detecting that the operation of the navigation system is turned-off, and means for detecting that the operation of the navigation system is turned-on.

21. A map data storing apparatus for a navigation system as defined in claim 19, where said means for converting the data representing the calculated route to the direction codes includes means for examining the connection point of each of the road links configuring the calculated route for determining the command code that points to the next node of the next link without uniquely identifying by a link number or node number.

22. A map data storing apparatus for a navigation system as defined in claim 21, wherein a first command code indicates that a plurality of road links are intersected at the connection point with a plurality of different directions and the operand attached to the first command code indicates a direction of the road link of the calculated route at the connection point.

23. A map data storing apparatus for a navigation system as defined in claim 22, wherein a second command code indicates that road links that configure the calculated route shift to a different data layer and the operand attached to the second command code indicates a number of data layers to be shifted from a current data layer.

24. A map data storing apparatus for a navigation system as defined in claim 22, wherein a third command code indicates that a plurality of road links that configure the calculated route are serially connected in the same direction in a straight line manner and the operand attached to the third command code indicates a number of road links connected serially by repeating the same direction as that of previous road link.

* * * * *